United States Patent
Kobayashi

(10) Patent No.: US 8,281,688 B2
(45) Date of Patent: Oct. 9, 2012

(54) WAVE GEAR DEVICE

(75) Inventor: Masaru Kobayashi, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 834 days.

(21) Appl. No.: 12/145,885

(22) Filed: Jun. 25, 2008

(65) Prior Publication Data

US 2009/0025500 A1    Jan. 29, 2009

(30) Foreign Application Priority Data

Jul. 27, 2007   (JP) .................... 2007-196338

(51) Int. Cl.
*F16H 33/00* (2006.01)
*F16D 7/02* (2006.01)

(52) U.S. Cl. .................... 74/640; 192/56.1

(58) Field of Classification Search ............... 74/604, 74/411, 439, 451; 464/30; 192/56.1
See application file for complete search history.

(56) References Cited

U.S. PATENT DOCUMENTS

| | | | | |
|---|---|---|---|---|
| 2,236,854 A * | 4/1941 | Ocenasek | .................... | 74/411 |
| 2,569,144 A * | 9/1951 | Benson | .................... | 464/44 |
| 4,716,785 A * | 1/1988 | Godai et al. | .................... | 74/640 |
| 4,825,720 A * | 5/1989 | Capdepuy | .................... | 74/640 |
| 6,564,677 B1 * | 5/2003 | Kiyosawa et al. | .................... | 74/640 |
| 6,848,998 B2 * | 2/2005 | Bosk | .................... | 464/43 |
| 2007/0199405 A1 * | 8/2007 | Kobayashi | .................... | 74/640 |

FOREIGN PATENT DOCUMENTS

JP   2005-054981 A   3/2005

* cited by examiner

*Primary Examiner* — Roger Pang
(74) *Attorney, Agent, or Firm* — Buchanan Ingersoll & Rooney PC

(57) ABSTRACT

A wave gear device is proposed having an anti-ratcheting mechanism having a simple configuration, wherein a center through-hole is formed in a cylinder hub of a wave generator, a small-diameter shaft end portion of a rotating input shaft is concentrically inserted in the center through-hole, and the two members are fastened by a fastening bolt, and a friction ring is concentrically sandwiched between the small-diameter shaft end portion and the cylinder hub and pressed in the radial direction with a prescribed force, whereby when transmission torque from the rotating input shaft to the wave generator 4 becomes excessive, slippage occurs in the rotational direction between the two members, transmission torque is limited, ratcheting generated between the two gears can be prevented.

3 Claims, 4 Drawing Sheets

WAVE GEAR DEVICE

TECHNICAL FIELD

The present invention relates to a wave gear device having an anti-ratcheting function for preventing the occurrence of ratcheting (gear jumping) due to torque overload.

BACKGROUND ART

An actuator incorporated into a robot arm or the like is known in which a wave gear device is provided as a reduction gear mechanism for reducing a rotational speed of a motor, which is the drive source of the actuator. The wave gear device is substantially composed of a rigid internally toothed gear, a flexible externally toothed gear disposed inside the rigid internally toothed gear, and a wave generator fitted inside the flexible externally toothed gear. A typical wave generator has an elliptical profile, which elliptically flexes the flexible externally toothed gear and partially mesh it with the rigid internally toothed gear. A high-speed rotating input shaft of a motor or the like is connected to the wave generator. The meshing locations of the two gears move circumferentially when the wave generator rotates at high speed, and the two gears rotate relative to each other in correspondence with the difference in the number of teeth between the two gears. Generally, the rigid internally toothed gear is fixed in place, and reduced-speed rotational output is obtained from the flexible externally toothed gear.

In a wave gear device, ratcheting (gear jumping) occurs between the two gears when torque overload acts during speed reduction, speed increase, or stoppage. When ratcheting has occurred, the ratcheting torque of the two gears is considerably reduced, plastic deformation occurs in each part, vibrations are increased or abnormal abrasion is generated, and other adverse effects are observed. It is difficult to reuse the wave gear device because of such adverse effects; even if the phase is adjusted after ratcheting has occurred.

A wave gear device is proposed in Patent Document 1 in which a safety function is provided for the case in which an excessive load is applied. In the wave gear device of the disclosure, a constriction force is applied to the housing to fit an internally toothed gear via an elastic member, and slippage is allowed to occur in the fitted location when an excessive load is applied so that the excessive load is not applied to the gear.

[Patent Document 1] JP-A 2005-54981

SUMMARY OF INVENTION

Technical Problem

Here, the magnitude of ratcheting torque of the wave gear device has the relationship in that its stoppage state>its speed increasing state>its speed reducing state, and is low in inverse proportion to the rotational speed of a wave generator. In an operating condition of the wave gear device incorporated into a robot arm or the like, ratcheting is in large part thought to occur in the following three patterns.

(1) When the wave gear device is operated under an excessive load using a motor having sufficient power (speed reducing state)

(2) When a robot arm or another load member is made to collide with a fixed object or the like during operation, causing considerable torque to be applied from the output side to the wave gear device (speed increasing state)

(3) When the wave generator is mechanically fixed in place, the wave gear device incorporated into a robot arm or another apparatus is inverted and considerable torque is applied from the output side to the wave gear device (stopping state)

As stated previously, when ratcheting has occurred, the phase in not merely offset, but, additionally, ratcheting torque is further reduced, vibrations are increased, and a reduction in the durable service life due to abrasive dust is brought about by the wear of the gear teeth of the wave gear device, plastic deformation of the outer ring of a web bearing of the wave generator and the raceway surface, and other drawbacks. Because of this, it becomes impossible to readjust the phase and reuse the device.

At this point, the relationship between the output-side torque and the input-side torque on the side of the wave generator in a wave gear device during speed increasing state and speed reducing state was confirmed to have the characteristic line A (speed reducing state) and characteristic line B (speed increasing state) shown in the graph of FIG. 1, regardless of the type of wave gear device. That is, (a) the torque on the side of the wave generator becomes sufficiently low in comparison with the output-side torque (approximately equal to inverse speed ratio);

(b) the torque on the side of the wave generator (W/G-side torque) is proportional to the output-side torque, but is ordinarily in a relationship whereby the torque during speed reducing state is greater than torque during speed increasing state;

(c) the output-side torque during a sudden increase in the torque on the side of the wave generator during speed reducing state is 60 to 75% of a ratcheting torque value RTa (during speed reducing state RT), and is less than the torque on the side of the wave generator at the time of a ratcheting torque value RTb (during speed increasing state RT) during speed increasing state; and (d) the dotted-line parts in the characteristic line A and characteristic line B of the graph are areas in which plastic deformation occurs in each part of the wave gear device, particularly in the tooth portion.

It was thus learned on the basis of such a relationship between the output-side torque and the torque on the side of the wave generator of the wave gear device that it is optimal to provide a ratchet prevention mechanism to the wave generator in order to prevent ratcheting.

It is also apparent that plastic deformation of each part of the wave gear device due to ratcheting and high loads can be prevented by providing the wave generator with a friction member in which slippage is brought about by the torque on the side of the wave generator that corresponds to the output-side torque equal to about 60 to 75% of the ratcheting torque value RTa during speed reducing state.

In a case in which a safety mechanism is provided to prevent an excessive load in the rigid internally toothed gear, which is the output side, the safety mechanism must be provided with a considerable torque transmission capacity, as shown in Patent Document 1. In addition, the allowable transmission torque varies considerably between speed reducing state and speed increasing state. Therefore, the maximum transmission torque during speed increasing state is excessively low when the allowable transmission torque is determined based on speed reducing state.

In view of the foregoing, an object of the present invention is to provide a wave gear device having an anti-ratcheting mechanism with a simple configuration that can prevent ratcheting from occurring during speed reducing state, speed increasing state, and stopping state, and plastic deformation from occurring in each part.

Solution to Problem

In order to solve the above-stated problems, the wave gear device of the present invention comprising:

a rigid internally toothed gear;

a flexible externally toothed gear coaxially disposed inside the rigid internally toothed gear;

a wave generator fitted inside of the flexible externally toothed gear;

a rotating input shaft;

a friction member disposed between the wave generator and the rotating input shaft so as to be sandwiched from the radial direction or the axial direction thereof; and a fastening member for coaxially fastening the wave generator and the rotating input shaft in a state in which the friction member is sandwiched therebetween, wherein the wave generator and the rotating input shaft integrally rotate due to a frictional coupling force of the friction member, and generate slippage in a rotational direction therebetween when a transmission torque therebetween reaches a predetermined value or higher.

Here, in the case that the wave generator has a cylindrical hub, a rigid cam plate mounted on an external peripheral surface of the cylindrical hub, and a wave bearing fitted to the external peripheral surface of the rigid cam plate, and that the rotary input shaft has a shaft end portion inserted in a center through-hole of the cylindrical hub, a friction ring concentrically fitted between the internal peripheral surface of the center through-hole of the cylinder hub and the external peripheral surface of the shaft end portion of the rotating input shaft can be used as the friction member In the case in which the friction member is sandwiched between the wave generator and the rotating input shaft from the axial direction, a friction plate may be used as a friction member, and the plate may be sandwiched between the shaft end surface of the cylinder hub and an annular stepped surface on a base side of the small-diameter shaft end portion of the rotating input shaft and A friction plate may be pressed against the shaft end surface of the cylindrical hub by the fastener member.

Here, it is preferred that the frictional coupling force of the friction member be set so that slippage is generated in the two gears when the transmission torque between the wave generator and the rotating input shaft reaches 60 to 75% of the ratcheting torque generated by the ratcheting therebetween.

Advantageous Effect of Invention

In the wave gear device of the present invention, a friction member is sandwiched between a rotating input shaft and a wave generator, and the input torque is transmitted from the rotating input shaft to the wave generator by the friction coupling force of the friction member. The torque on the side of the wave generator is sufficiently less than the output-side torque and does not substantially vary with the operating mode (speed increasing mode, speed reducing mode, stopping mode) of the wave gear device. A simple anti-ratcheting mechanism that uses a friction ring or a friction plate can therefore be implemented.

In the present invention, the slippage between the wave generator and the rotating input shaft is designed to occur at 60 to 75% of the ratcheting torque value of the two gears. Consequently, plastic deformation produced in a tooth portion or the like can be prevented in advance before the two gears enter a state of ratcheting.

DESCRIPTION OF EMBODIMENTS

Embodiments of a wave gear device to which the present invention has been applied are described below with reference to the drawings.

Embodiment 1

Figure 1:
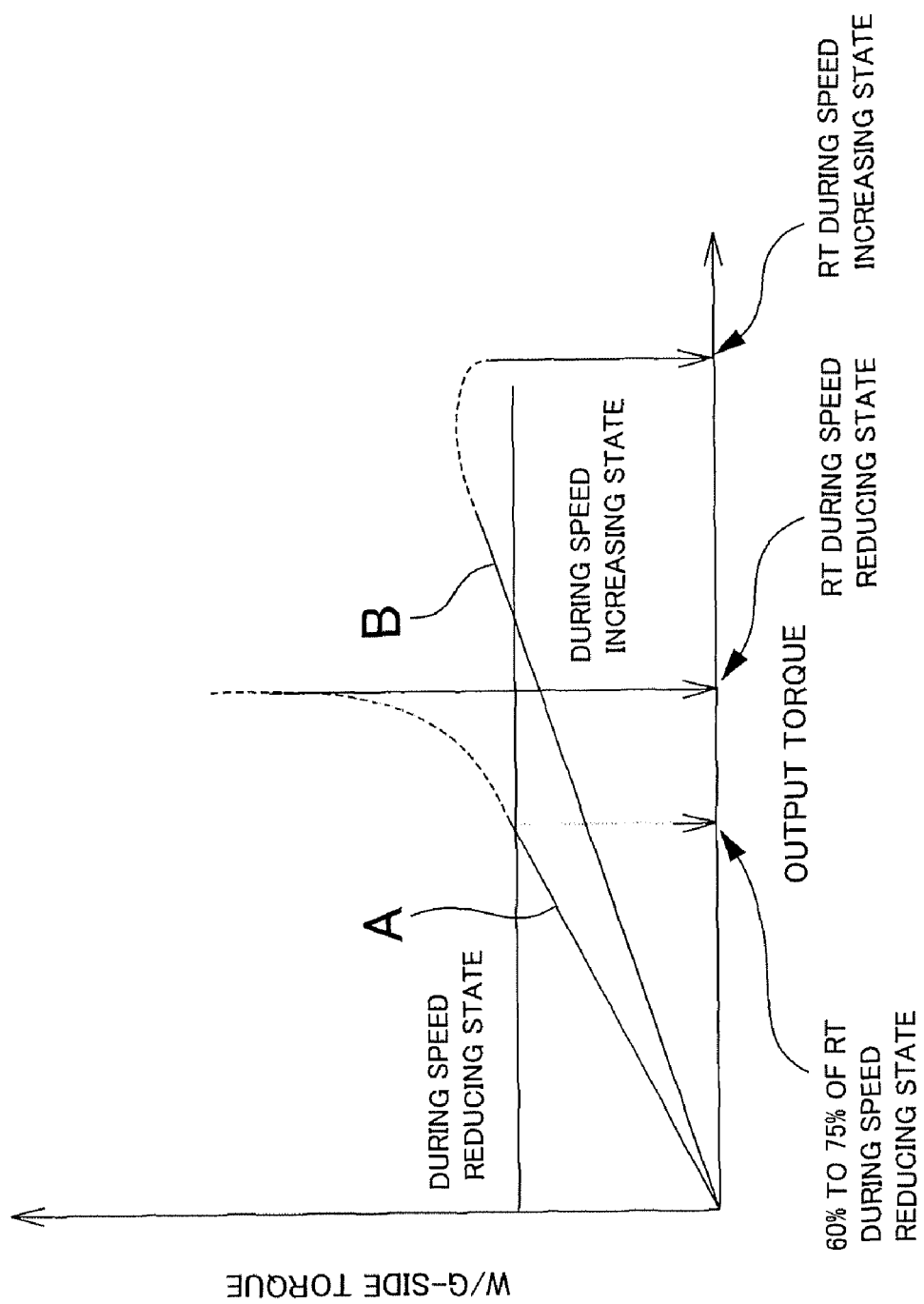
FIG. 1 is a graph showing the relationship between the output-side torque and the torque on the side of the wave generator of a wave gear device.
Figure 2:
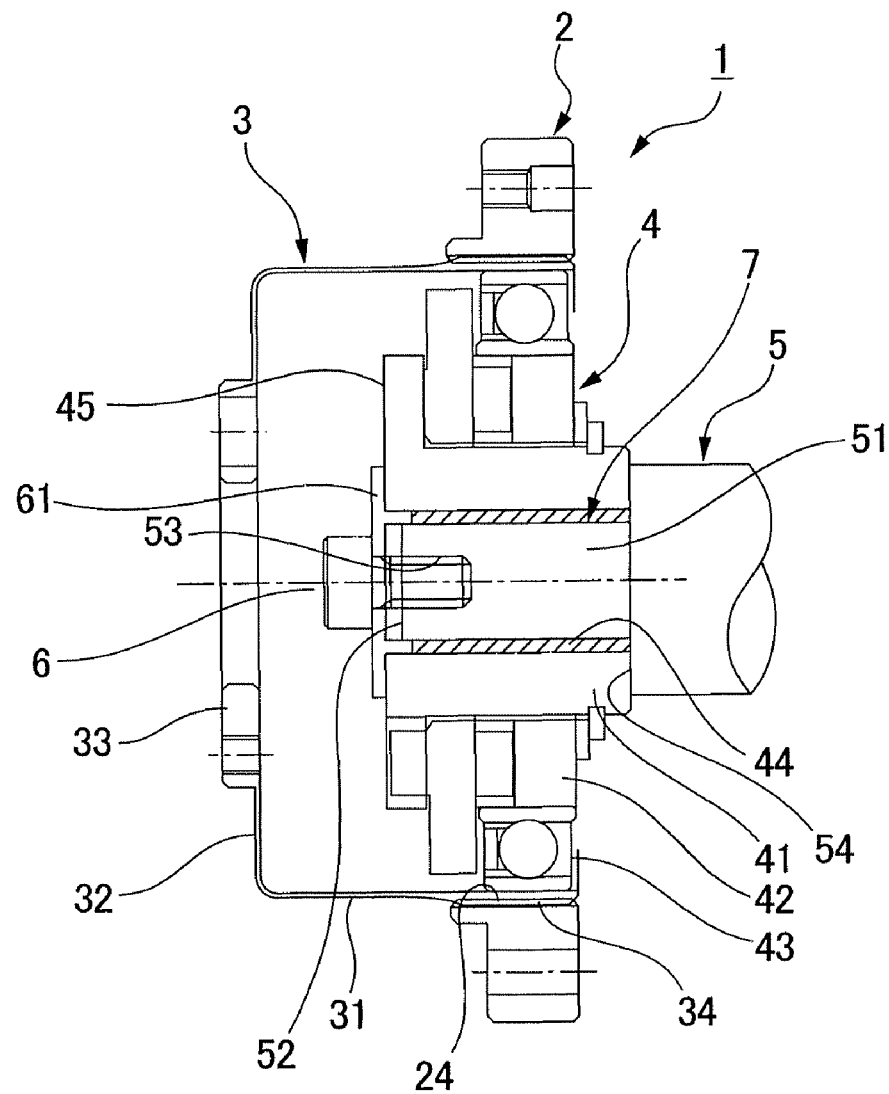
FIG. 2 is a schematic longitudinal sectional view showing the wave gear device in accordance with embodiment 1 of the present invention.

FIG. 2 is a schematic longitudinal sectional view that shows a cup-type wave gear device to which the present invention has been applied. A wave gear device 1 has an annular rigid internally toothed gear 2, a cup-shaped flexible externally toothed gear 3 coaxially disposed inside the rigid internally toothed gear, and a wave generator 4 having an elliptical profile fitted inside the flexible externally toothed gear 3. The wave generator 4 elliptically flexes the flexible externally toothed gear, and external teeth 34 of the two end portions of the major axis thereof are made to mesh with internal teeth 24 of the rigid internally toothed gear 2.

A motor shaft or another rotating input shaft 5 is coaxially connected and secured to the wave generator 4. When the wave generator 4 is rotated by the rotating input shaft 5, the meshing location of the two gears 2, 3 moves in the circumferential direction, and the two gears rotate relative to each other in correspondence with the difference in the number of teeth between the two gears. In general, the number of teeth of the flexible externally toothed gear 3 in relation to the rigid internally toothed gear 2 is 2n (n: positive integer) fewer. For example, the rigid internally toothed gear 2 secured to a fixed-side member (not shown), the flexible externally toothed gear 3 is connected to a load-side member (not shown), and reduced-speed rotational output is transmitted from the flexible externally toothed gear 3 to the load-side member.

The cup-shaped flexible externally toothed gear 3 is provided with a cylindrical trunk 31, an annular diaphragm 32 that seals one end of the trunk 31, a thick annular boss 33 integrally formed at the internal peripheral edge of the diaphragm, and external teeth 34 formed on the external peripheral surface of the open other end of the trunk 31. A load-side member (not shown) is connected to the annular boss 33.

The wave generator 4 has a cylinder hub 41, a rigid cam plate 42 having an elliptical profile mounted on the external peripheral surface of the cylinder hub, and a wave bearing 43 fitted to the external peripheral surface of the rigid cam plate 42. The wave bearing 43 is composed of flexible outer and inner rings, and a plurality of balls rollably inserted between the flexible external and the internal rings.

Here, a small-diameter shaft end portion 51 of the rotating input shaft 5 is inserted in the center-through hole 44 of the cylinder hub 41. The axial length of the small-diameter shaft portion 51 is slightly less than the axial length of the center-through hole 44 of the cylinder 41, and a shaft end surface 52 of the small-diameter shaft portion 51 is positioned near a shaft end surface 45 of the cylinder hub 41. A screw-hole 53 is formed in the small-diameter shaft end portion 51 from the shaft end surface 52 thereof, and a fastening bolt 6 is placed on one side of a washer 61 and is threadably secured in place. The cylinder hub 41 is fastened and secured between the annular stepped surface 54 of the base side of the small-diameter shaft end portion 51 of the rotating input member 5 and the washer 61 by the fastening bolt 6.

A friction ring 7 is concentrically sandwiched between the cylinder hub 41 and the small-diameter shaft end portion 51 of the rotating input shaft 5. The friction ring 7 is a ring having a set thickness, the axial length of the friction ring is slightly less than that of the small-diameter shaft end portion 51, one end of the friction ring 7 is in contact with an annular stepped surface 54, and the other end of the ring extends to the vicinity of the shaft end surface 52 of the small-diameter shaft end portion 51.

The friction coefficient of the friction ring 7 and the tightening force in the radial direction of the friction ring 7 are adjusted, whereby a setting is established so that slippage occurs in the rotational direction between the rotating input shaft 5 and the cylinder hub 41 when the transmission torque from the rotating input shaft 5 to the cylinder hub 41 reaches 60 to 75% of the ratcheting torque level RTa. The ratcheting torque value RTa is the transmission torque of the wave generator 4 at the time when ratcheting occurs between the two gears 2, 3 of the wave gear device 1 during speed reducing state.

Embodiment 2

Figure 3:
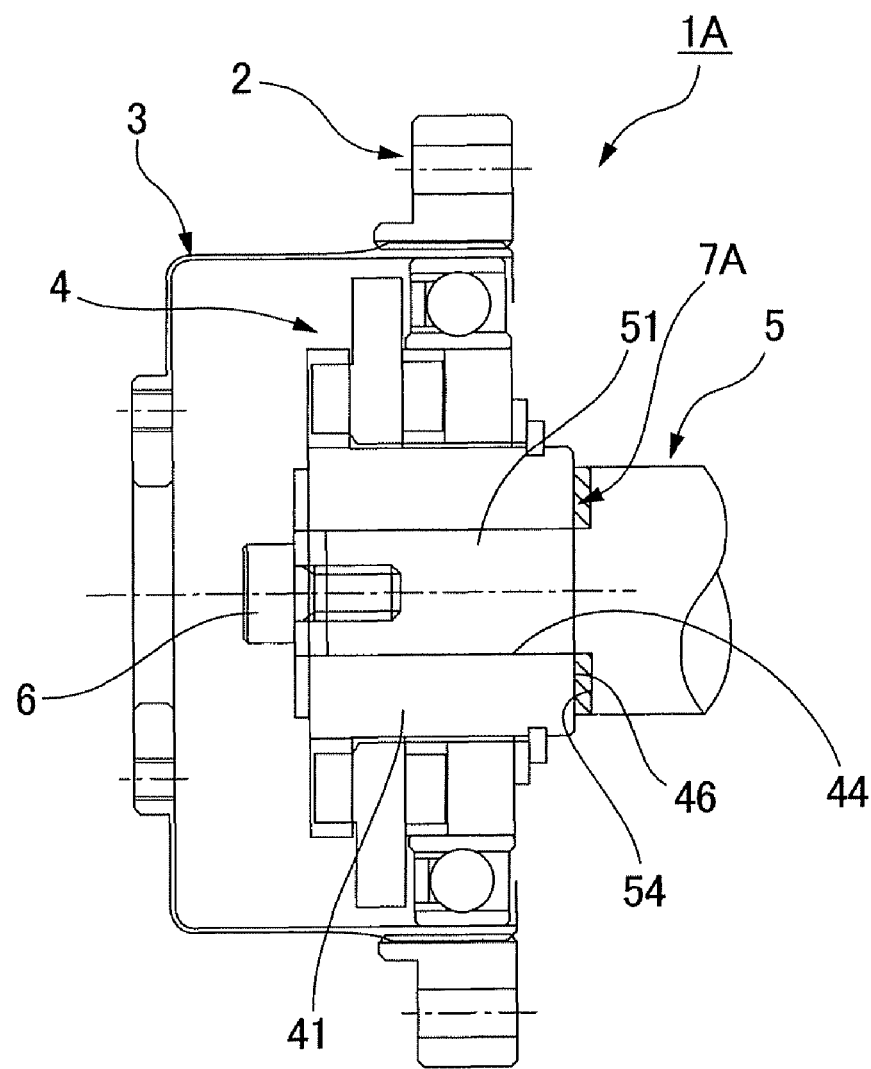
FIG. 3 is a schematic longitudinal sectional view showing the wave gear device in accordance with embodiment 2 of the present invention.

FIG. 3 is a schematic longitudinal sectional view that shows the wave gear device of embodiment 2 to which the present invention has been applied. Since the essential composition of the wave gear device 1A is the same as that of the wave gear device 1 of embodiment 1, the same reference numerals are used for the corresponding locations, and a description thereof is omitted.

In the wave gear device 1A of embodiment 2, the small-diameter shaft end portion 51 of the rotating input shaft 5 is directly press-fitted without an interposed friction ring to a center through-hole 44 of the cylinder hub 41 and secured to the cylinder hub 41 with the aid of the fastening bolt 6.

A friction disc 7A provided with a center-hole is sandwiched between the annular step surface 54 of the rotating input shaft 5 and the shaft end surface 46 of the cylinder hub 41 that faces the annular step surface. The friction coefficient of the friction disc 7A and the tightening force in the radial direction of the friction disc 7A are adjusted, whereby a setting is established so that slippage is set to occur in the rotational direction between the rotating input shaft 5 and the cylinder hub 41 when the transmission torque from the rotating input shaft 5 to the cylinder hub 41 reaches 60 to 75% of the ratcheting torque value RTa.

Figure 4:
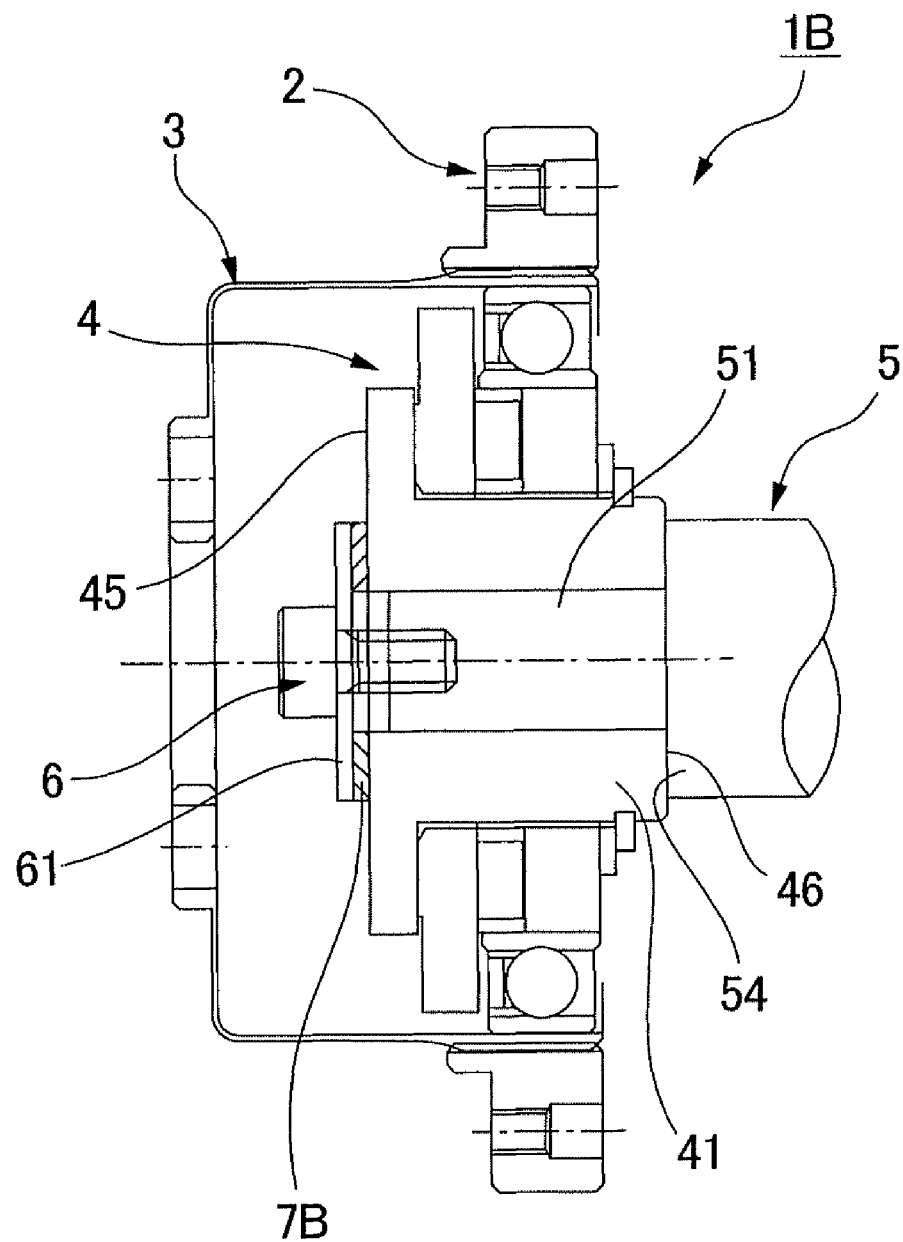
FIG. 4 is a schematic longitudinal sectional view showing a modification of the wave gear device of FIG. 3.

The wave gear device 1B shown in FIG. 4 is a modification of the wave gear device 1A. A friction disc 7B is sandwiched between the washer 61 and the shaft end surface 45 of the opposite side of the cylinder hub 41. The friction discs 7B and 7A can also be used at the same time. For example, the friction disc 7B is sandwiched between the shaft end surface 45 of the cylinder hub 41 and the washer 61, and the friction disc 7A is sandwiched between the other shaft end surface 46 of the cylinder hub 41 and the annular step surface 54.

The invention claimed is:

1. A wave gear device comprising:
a rigid internally toothed gear;
a flexible externally toothed gear coaxially disposed inside the rigid internally toothed gear;
a wave generator fitted inside of the flexible externally toothed gear;
a rotating input shaft;
a friction member disposed in between the wave generator and the rotating input shaft so as to be sandwiched from a radial direction or an axial direction thereof; and
a fastening member for coaxially fastening the wave generator and the rotating input shaft in a state in which the friction member is sandwiched therebetween, the fastening member being threadably secured directly to the input shaft; and
a washer disposed between the fastening member and the input shaft; wherein
the wave generator and the rotating input shaft integrally rotate due to a frictional coupling force of the friction member, and generate slippage in the rotational direction therebetween when the transmission torque between the wave generator and the rotating input shaft reaches a predetermined value or higher.

2. The wave gear device according to claim 1, wherein
the wave generator has a cylindrical hub, a rigid cam plate mounted on an external peripheral surface of the cylindrical hub, and a wave bearing fitted to an external peripheral surface of the rigid cam plate;
the rotating input shaft has a shaft end portion inserted in a center through-hole of the cylindrical hub; and
the friction member is a friction ring concentrically fitted between an internal peripheral surface of the center through-hole of the cylindrical hub and an external peripheral surface of the shaft end portion of the rotating input shaft.

3. The wave gear device according to claim 1, wherein the wave generator and the rotating input shaft generate slippage in the rotational direction therebetween when the transmission torque between the wave generator and the rotating input shaft reaches 60 to 75% of the ratcheting torque generated by the ratcheting therebetween during speed reducing state.

\* \* \* \* \*